United States Patent
Corriveau et al.

(10) Patent No.: US 6,849,280 B2
(45) Date of Patent: Feb. 1, 2005

(54) COATED GUM AND METHODS OF PRODUCING SAME

(75) Inventors: Christine L. Corriveau, Orland Park, IL (US); Dianna Lynn Grasela, Aurora, IL (US); Gwendolyn Graff, DeKalb, IL (US)

(73) Assignee: Wm. Wrigley Jr. Company, Chicago, IL (US)

( * ) Notice: Subject to any disclaimer, the term of this patent is extended or adjusted under 35 U.S.C. 154(b) by 338 days.

(21) Appl. No.: 10/065,097

(22) Filed: Sep. 17, 2002

(65) Prior Publication Data

US 2004/0052899 A1 Mar. 18, 2004

(51) Int. Cl.⁷ ................................................ A23G 3/30
(52) U.S. Cl. ............................................. 426/5; 426/3
(58) Field of Search ........................................ 426/3, 5

(56) References Cited

U.S. PATENT DOCUMENTS

| | | |
|---|---|---|
| 146,541 A | 1/1874 | Moore |
| 4,501,758 A | 2/1985 | Morris |
| 4,515,820 A | 5/1985 | Tang |
| 4,522,833 A | 6/1985 | Sharma |
| 4,692,342 A | 9/1987 | Gannis et al. |
| 4,828,858 A | 5/1989 | Holloway, Jr. et al. |
| 4,910,028 A | 3/1990 | Bernacchi et al. |
| 5,008,122 A | 4/1991 | Rosnack et al. |
| 5,061,499 A | 10/1991 | Holloway, Jr. et al. |
| 5,525,351 A | 6/1996 | Dam |
| 5,525,361 A * | 6/1996 | Hightower ...................... 426/3 |
| 5,603,977 A | 2/1997 | Kobayashi et al. |
| 6,703,000 B2 * | 3/2004 | Ning et al. .................... 424/58 |
| 6,706,256 B2 * | 3/2004 | Lawlor ......................... 424/58 |

* cited by examiner

*Primary Examiner*—Arthur L. Corbin
(74) *Attorney, Agent, or Firm*—Bell, Boyd & Lloyd LLC

(57) ABSTRACT

Gums and methods of producing gums are provided. The present invention includes a gum that has a coating layer composed of a bulk sweetener which has been formed by heating and/or searing the gum. The bulk sweetener on the surface of the gum becomes caramelized and subsequently cooled over time at desirable temperatures. The resultant coating layer includes a hardened and caramelized bulk sweetener that can enhance the flavor, the appearance, the mouthfeel and the overall recreational enjoyment of the gum during use.

20 Claims, No Drawings

COATED GUM AND METHODS OF PRODUCING SAME

BACKGROUND OF THE INVENTION

The present invention generally relates to gums. More specifically, the present invention relates to coated gums and methods of producing same.

Of course, gum and products thereof have been known for a great number of years. Over the years, a variety of different gums, such as chewing gums and bubble gums, and products thereof have been developed to improve and enhance the quality of these products. Known gum products include, for example: sugar, sugar free, low calorie and the like. Likewise, a variety of different shapes, sizes and colors of gums are known and used. For example, it is known to provide individual pieces of gum in the form of chunks, sticks, tapes, shredded pieces, tabs, pellets, balls or the like. Each form can include a variety of different shapes and sizes.

Gums and gum products are known to include a coating layer applied to the outer surface of the gum. The coating layer can include a number of different types of materials. For example, the coating layer can be composed of a hardboiled candy coating material. This is typically applied to the outer gum surface under specific operating conditions such that a candy coated gum can be formed.

The candy coated gum is known to exist in a variety of different forms. For example, it is known to provide a gum with multiple layers of gum mass and candy coating in a laminated structure, such as a honeycombed structure. Another example of a candy coated gum includes a lollipop-type product. This type of product includes a gum, typically bubble gum, with a hardboiled candy coating layer applied to the gum to form the lollipop-type product. Once the candy coating layer is removed, the gum can then be chewed and blown for further recreation.

However, the manufacture of such types of coated gum products necessarily requires the additional processing step of applying the coating material to the gum surface. In this regard, extensive modifications must necessarily be made to typical gum manufacturing processes and/or candy manufacturing processes to enable the candy coating to be applied to the surface of the gum.

A need, therefore, exists to provide improved coated gums that can enhance a level of enjoyment and excitement one gains from chewing and/or blowing same and that can be readily manufactured.

SUMMARY OF THE INVENTION

The present invention relates to gums and methods of producing same. The present invention includes a gum, such as bubble gum, that has a coating layer formed on an outer surface of the gum. In general, the coating layer is formed by heating the gum at a temperature and for a period of time effective to cause caramelization of a bulk sweetener ingredient of the gum. The gum is then cooled to form the coating layer composed of the caramelized bulk sweetener ingredient that has hardened. The hardened and caramelized coating layer can enhance the mouthfeel, appearance, flavor and overall recreational enjoyment when the gum is chewed.

Applicants believe that the coating layer of the present invention can be produced without extensive modifications to typical gum making processes. The coated gum of the present invention can be made in essentially the same way as compared to a non-coated gum. A primary difference is that an additional heating/cooling process stage is necessary to produce the hardened and caramelized bulk sweetener coating. In this regard, the coating layer of the present invention can be formed from the ingredients of the gum, particularly the bulk sweetener. This contrasts typical coated gums which can require additional handling and processing procedures to apply a separate coating material to the gum.

The coating layer of the present invention can be produced in any variety of suitable ways. The gum includes a gum material composed of a number of ingredients that can be mixed and formed into a suitable shape, such as a pellet, a tab, a chunk, a ball or the like, for further processing. With this type of shape, the gum has a relatively low surface area as compared to other types of gum shapes, such as a stick. In this regard, the gum will not entirely melt into its initial mixed state when subject to the heating conditions of the present invention to form the coating layer.

Once formed in shape, the gum material is then subject to heating and subsequent cooling stages to form the hard, caramelized coating. The heating process is conducted at a temperature and for a period of time effective to cause the bulk sweetener to caramelize on at least a portion of the surface of the gum. In an embodiment, the heating process is conducted at relatively high temperatures for a short period of time. In comparison, the gum is heated in an analogous way as how, for example, a marshmallow is roasted over the fire, a fish filet is seared on the grill or the like.

In this regard, a roasted, caramelized and/or seared outer layer is formed composed of at least a portion of the bulk sweetener from the initial gum ingredients. The caramelized shell thus surrounds at least a portion of a gum center to form a coating layer. The gum material is then subject to a cooling process allowing the caramelized outer layer to harden on the gum center.

It is, therefore, an advantage of the present invention to provide an improved coated gum.

Another advantage of the present invention is to provide an improved gum that has a coating layer composed of one or more ingredients of the gum which has been caramelized and subsequently hardened.

A further advantage of the present invention is to provide a method for producing a coated gum that heats the gum at a temperature and over a period of time effective to cause ingredients in the gum to caramelize. Once cooled, the caramelized portion forms a hard coating on at least a portion of the gum surface.

A still further advantage of the present invention is to provide a gum that creates increased levels of enjoyment and excitement during use.

Yet a still further advantage of the present invention is to produce a coated gum without requiring extensive modifications to the gum making process.

Additional features and advantages of the present invention are described in, and will be apparent from, the following Detailed Description of the Invention.

DETAILED DESCRIPTION OF THE INVENTION

The present invention relates to gums and methods of producing same. More specifically, the present invention relates to gums that include a hardened coating layer formed by heating and subsequently cooling the gum during processing. In this regard, the coating layer can be formed without having to apply a separate coating material to the outer surface of the gum. Applicants believe that the coated gum of the present invention can be prepared without requiring extensive modifications to typical gum making processes.

In an embodiment, the coating layer is composed of a bulk sweetener ingredient(s) added to the gum during mixing and processing of the initial gum ingredients. Under suitable temperatures, the bulk sweetener(s) can be caramelized and subsequently hardened to form the coating layer. This can enhance the mouthfeel, appearance, flavor and overall recreational enjoyment of the gum during chewing, blowing and general use.

The coating process of the present invention can be conducted in any suitable manner. A number of ingredients are initially mixed under typical gum processing conditions to form a gum mass or material into a desirable shape for further processing. The ingredients at least include a base portion and a bulk sweetener. Illustrative examples of various types and amounts of gum ingredients are described in more detail below.

The bulk sweetener is a primary active ingredient with respect to the coating process of the present invention. Of course, other gum ingredients and/or properties can influence the coating process, such as the moisture content of the gum. In an embodiment, the bulk sweetener can include a sugar bulk sweetener, a sugarless bulk sweetener, the like and combinations thereof. The bulk sweetener can be mixed in any suitable amount with the other gum ingredients. In an embodiment, the gum mass or material includes about 40% or more by weight of the bulk sweetener.

Once the gum ingredients are mixed, the gum mass or material is formed into a suitable shape. For example, the shape can include a tab, a pellet, a chunk, a ball or the like. This type of shape is preferred over other shapes, such as a stick. In this regard, the gum material has a small surface area as compared to a gum material in the shape of a stick, for example. This is necessary such that the gum material does not completely melt when subject to further heat processing as discussed below.

To prepare the coating layer, the gum material is first heated and then subsequently cooled. In an embodiment, the processed gum mass is subject to a temperature over a given period of time effective to heat, sear and/or roast the gum such that its surface or portion thereof is caramelized due to the bulk sweetener in the gum mass.

As used herein, the terms "sear", "roast" and other like terms are meant to describe how the gum is heated to form the coating layer. The term "sear" means heating quickly at high temperatures analogous to, for example, how meat, fish or poultry is seared on a grill. The term "roast" means heating at high temperatures over a desirable period of time analogous to, for example, how a marshmallow is roasted over an open flame. In this regard, the effect of searing and/or roasting causes the bulk sweetener ingredient of the gum to caramelize such that it can harden to form the coating layer upon subsequent cooling.

As used herein, the term "caramelized" and other like terms means that the gum forms a viscous liquid layer on at least a portion of its surface upon heating at searing and/or roasting conditions due to the melting of gum ingredients, particularly the bulk sweetener.

It should be appreciated that the heating, searing and/or roasting temperatures are not to exceed levels which would necessarily cause the entire gum mass to melt. The heating time can also be used to control the searing and/or roasting effect of the heating process. At elevated temperatures, the gum mass can be heated for lesser periods of time to prevent the entire gum mass from melting. In an embodiment, the gum mass is heated at a temperature of about 100° C. or greater for about 30 seconds or less. However, any suitable heating temperature and time can be used.

The heating process can be conducted in a variety of suitable ways. For example, the heat can be generated from a radiant heat source, a gas flame, a convection heat process and/or the like. In this regard, it is believed that the typical gum manufacturing process can be modified with relative ease to carry out the heating process of the present invention.

Once heated or seared, the processed gum mass is then cooled at a temperature and over a time period such that the caramelized surface hardens to form the coating layer. This can be conducted in a variety of different manners. For example, air at ambient temperature and pressure, such as at about 25° C. under atmospheric pressure, can be blown or circulated about the heated gum mass until it cools the coating layer to a hardened state. In an embodiment, the heated gum mass can be cooled at temperatures less than ambient temperatures to cause the gum mass to cool at a faster and more desirable rate.

When chewed, the coating layer can provide enhanced flavor due to the flavor effects of the bulk sweetener, which are concentrated in the coating layer. As the gum is chewed, particularly at an initial stage, the hardened and caramelized bulk sweetener causes the coating layer to crunch against one's teeth. This sensation can enhance mouthfeel during use.

Prior to heating, an additional bulk sweetener can be added to the processed gum mass. The added bulk sweetener can include a sugar bulk sweetener, a sugarless bulk sweetener and combinations thereof. The additional bulk sweetener can be added in any suitable form, such as in a liquid, syrup, powdered, crystalline and/or the like. In an embodiment, it can be the same or substantially similar to the bulk sweetener mixed with the initial gum ingredients. The additional bulk sweetener can be added to the surface of the gum in a sufficient amount to enhance the coating process.

The gum of the present invention can include any suitable type and amount of ingredients. The gum base generally comprises elastomers, resins, fats and oils, softeners, and inorganic fillers. The gum base may or may not include wax. The insoluble gum base can constitute approximately 5% to about 75%, by weight, of the gum, more commonly, the gum base comprises 10% to about 50% of the gum, and in some preferred embodiments, 20% to about 35%, by weight, of the gum.

In an embodiment, the gum base of the present invention contains about 20 weight % to about 60 weight % synthetic elastomer, 0 weight % to about 30 weight % natural elastomer, about 5 weight % to about 55 weight % elastomer plasticizer, about 4 weight % to about 35 weight % filler, about 5 weight % to about 35 weight % softener, and optional minor amounts (about 5% or less) of miscellaneous ingredients such as colorants, antioxidants, etc.

Synthetic elastomers may include, but are not limited to: polyisobutylene with GPC weight average molecular weight of about 10,000 to about 95,000, isobutylene-isoprene copolymer (butyl elastomer), styrene-butadiene copolymers having styrene-butadiene ratios of about 1:3 to about 3:1, polyvinyl acetate having GPC weight average molecular weight of about 2,000 to about 90,000, polyisoprene, polyethylene, vinyl acetate-vinyl laurate copolymer having vinyl laurate content of about 5% to about 50% by weight of the copolymer, and combinations thereof.

Preferred ranges are, for polyisobutylene, 50,000 to 80,000 GPC weight average molecular weight, for styrene-butadiene, 1:1 to 1:3 bound styrene-butadiene, for polyvinyl acetate, 10,000 to 65,000 GPC weight average molecular weight with the higher molecular weight polyvinyl acetates typically used in bubble gum base, and for vinyl acetate-vinyl laurate, vinyl laurate content of 10%–45%.

Natural elastomers may include natural rubber such as smoked or liquid latex and guayule as well as natural gums such as jelutong, lechi caspi, perillo, sorva, massaranduba balata, massaranduba chocolate, nispero, rosindinha, chicle, gutta hang kang, and combinations thereof. The preferred synthetic elastomer and natural elastomer concentrations vary depending on whether the gum in which the base is used is adhesive or conventional, bubble gum or regular gum, as discussed below. Preferred natural elastomers include jelutong, chicle, sorva and massaranduba balata.

Elastomer plasticizers may include, but are not limited to, natural rosin esters such as glycerol esters of partially hydrogenated rosin, glycerol esters polymerized rosin, glycerol esters of partially dimerized rosin, glycerol esters of rosin, pentaerythritol esters of partially hydrogenated rosin, methyl and partially hydrogenated methyl esters of rosin, pentaerythritol esters of rosin; synthetics such as terpene resins derived from alpha-pinene, beta-pinene, and/or d-limonene; and any suitable combinations of the foregoing. The preferred elastomer plasticizers will also vary depending on the specific application, and on the type of elastomer which is used.

Fillers/texturizers may include magnesium and calcium carbonate, ground limestone, silicate types such as magnesium and aluminum silicate, clay, alumina, talc, titanium oxide, mono-, di- and tri-calcium phosphate, cellulose polymers, such as wood, and combinations thereof.

Softeners/emulsifiers may include tallow, hydrogenated tallow, hydrogenated and partially hydrogenated vegetable oils, cocoa butter, glycerol monostearate, glycerol triacetate, lecithin, mono-, di- and triglycerides, acetylated monoglycerides, fatty acids (e.g. stearic, palmitic, oleic and linoleic acids), and combinations thereof.

Colorants and whiteners may include FD&C-type dyes and lakes, fruit and vegetable extracts, titanium dioxide, and combinations thereof.

The base may or may not include wax. An example of a wax-free gum base is disclosed in U.S. Pat. No. 5,286,500, the disclosure of which is incorporated herein by reference.

In addition to a water insoluble gum base portion, a typical gum composition includes a water soluble bulk portion and one or more flavoring agents. The water soluble portion can include bulk sweeteners, high intensity sweeteners, flavoring agents, softeners, emulsifiers, colors, acidulants, fillers, antioxidants, and other components that provide desired attributes.

Softeners are added to the gum in order to optimize the chewability and mouth feel of the gum. The softeners, which are also known as plasticizers and plasticizing agents, generally constitute between approximately 0.5% to about 15% by weight of the gum. The softeners may include glycerin, lecithin, and combinations thereof. Aqueous sweetener solutions such as those containing sorbitol, hydrogenated starch hydrolystates, corn syrup and combinations thereof, may also be used as softeners and binding agents in gum.

In an embodiment, bulk sweeteners include both sugar and sugarless components. Bulk sweeteners typically constitute 5% to about 95% by weight of the gum, more typically, 20% to 80% by weight, and more commonly, 30% to 60% by weight of the gum.

Sugar bulk sweeteners generally include saccharide-containing components commonly known in the gum art, including, but not limited to, sucrose, dextrose, maltose, dextrin, dried invert sugar, fructose, levulose, galactose, corn syrup solids, and the like, alone or in combination.

Sugarless bulk sweeteners include, but are not limited to, sugar alcohols such as sorbitol, mannitol, xylitol, hydrogenated starch hydrolysates, maltitol, and the like, alone or in combination.

High intensity artificial sweeteners can also be used in combination with the above. Preferred high intensity sweeteners include, but are not limited to, sucralose, aspartame, salts of acesulfame, alitame, saccharin and its salts, cyclamic acid and its salts, glycyrrhizin, dihydrochalcones, thaumatin, monellin, and the like, alone or in combination. In order to provide longer lasting sweetness and flavor perception, it may be desirable to encapsulate or otherwise control the release of at least a portion of the high intensity artificial sweetener. Such techniques as wet granulation, wax granulation, spray drying, spray chilling, fluid bed coating, coacervation, and fiber extrusion may be used to achieve the desired release characteristics. Colors and high intensity sweeteners can also be encapsulated together.

Usage level of the high intensity artificial sweetener will vary greatly and will depend on such factors as potency of the sweetener, rate of release, desired sweetness of the product, level and type of flavor used and cost considerations. Thus, the active level of the high intensity artificial sweetener may vary from 0.02% to about 8%. When carriers used for encapsulation are included, the usage level of the encapsulated sweetener will be proportionately higher.

Combinations of sugar and/or sugarless sweeteners may be used in gum. Additionally, the softener may also provide additional sweetness such as with aqueous sugar or alditol solutions.

If a low calorie gum is desired, a low caloric bulking agent can be used. Examples of low caloric bulking agents include: polydextrose; Raftilose; Raftilin; Fructooligosaccharides (NutraFlora); Palatinose oligosaccharide; Guar Gum Hydrolysate (Sun Fiber); or indigestible dextrin (Fibersol). However, other low calorie bulking agents can be used.

A variety of flavoring agents can be used. The flavor can be used in amounts of approximately 0.1 weight % to about 15 weight % of the gum, and preferably, 0.2% to 5%. Flavoring agents may include essential oils, synthetic flavors or mixtures thereof including, but not limited to, oils derived from plants and fruits such as citrus oils, fruit essences, peppermint oil, spearmint oil, other mint oils, clove oil, oil of wintergreen, anise and the like. Artificial flavoring agents and components may also be used. It is generally understood that the flavoring agents can be in the form of a liquid, spray dried or in any other suitable form. Natural and artificial flavoring agents may be combined in any sensorially acceptable fashion.

Additional oral health ingredients may be added including but not limited to, antiplaque/anti-gingivitis agents (such as chlorhexidine, CPC, triclosan), pH control agents (including Urea and buffers), other inorganic components for tartar or caries control (phosphates, fluoride) and biological agents (antibodies, enzymes). The only requirement is that the agents be safe and effective and that they do not react undesirably with each other such as may happen with phosphate salts.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

What is claimed is:

1. A method of producing a gum, the method comprising the steps of:
   providing a plurality of gum ingredients at least including a base portion and a bulk sweetener;
   processing the gum ingredients to form a gum material defining a gum surface; and
   heating the gum material at a temperature effective to caramelize the bulk sweetener on at least a portion of the gum surface.

2. The method of claim 1 further comprising the steps of cooling the gum material subsequent to heating and forming a coating layer on the gum surface including the bulk sweetener that has caramelized.

3. The method of claim 1 wherein the bulk sweetener is selected from the group consisting of sugar bulk sweeteners and sugarless bulk sweeteners.

4. The method of claim 1 wherein the gum material is heated at the temperature and over a time period effective to sear the gum surface.

5. The method of claim 1 wherein an additional bulk sweetener is applied to the gum surface of the gum material prior to heating.

6. The method of claim 5 wherein the gum material is heated to allow caramelization of the bulk sweetener and the additional bulk sweetener on at least a portion of the gum surface.

7. The method of claim 6 further comprising the steps of cooling the gum material subsequent to heating and forming a coating layer with the bulk sweetener and additional bulk sweetener that has hardened and caramelized.

8. The method of claim 5 wherein the additional bulk sweetener is selected from the group consisting of a saccharide-containing component, a sugar alcohol and combinations thereof.

9. The method of claim 1 wherein the gum material is formed into a shape selected from the group consisting of a chunk, a pellet, a ball, and a tab prior to a heating.

10. The method of claim 1 wherein the gum is selected from the group consisting of a chewing gum and a bubble gum.

11. A method of forming a coating layer on a gum comprising the steps of:
    providing a gum material at least including a base portion and a bulk sweetener wherein the gum material has a definable shape with a gum surface;
    searing the gum material at a temperature and over a period of time effective to allow caramelization of the bulk sweetener on at least a portion of the gum surface; and
    cooling the gum product at an effective cooling temperature to form a coating layer on the gum surface wherein the coating layer includes an amount of the bulk sweetener that has caramelized.

12. The method of claim 11 further comprising the steps of adding an additional bulk sweetener to the gum surface prior to heating and subsequently forming the coating layer with the bulk sweetener and the additional bulk sweetener that have caramelized and hardened.

13. The method of claim 12 wherein the bulk sweetener and the additional bulk sweetener are selected from the group consisting of a saccharide-containing component, a sugar alcohol and combinations thereof.

14. The method of claim 11 wherein the definable shape of the gum material is selected from the group consisting of a chunk, a pellet and a tab.

15. A coated gum comprising:
    a gum center including at least a base portion and a bulk sweetener; and
    a layer surrounding the gum center comprising a caramelized bulk sweetener.

16. The coated gum of claim 15 wherein the coated gum is selected from the group consisting of a bubble gum and a chewing gum.

17. The coated gum of claim 15 wherein the definable shape of the gum material is selected from the group consisting of a chunk, a tab, a ball, and a pellet.

18. The coated gum of claim 15 wherein the bulk sweetener is selected from the group consisting of a saccharide-containing component, a sugar alcohol and combinations thereof.

19. The coated gum of claim 15 wherein the bulk sweetener comprises about 40% or more by weight of the gum material.

20. The coated gum of claim 15 wherein the coating layer includes the bulk sweetener and an additional bulk sweetener applied to the gum surface prior to caramelization.

* * * * *